(12) United States Patent
Cadeau

(10) Patent No.: US 12,722,576 B1
(45) Date of Patent: Sep. 1, 2026

(54) ADJUSTABLE ANGLE HITCH-MOUNTED LOAD CARRIER FOR OVERSIZED ITEMS

(71) Applicant: Benjamin Cadeau, Pensacola, FL (US)

(72) Inventor: Benjamin Cadeau, Pensacola, FL (US)

( * ) Notice: Subject to any disclaimer, the term of this patent is extended or adjusted under 35 U.S.C. 154(b) by 35 days.

(21) Appl. No.: 18/798,531

(22) Filed: Aug. 8, 2024

Related U.S. Application Data

(63) Continuation-in-part of application No. 18/545,646, filed on Dec. 19, 2023, now abandoned.

(60) Provisional application No. 63/464,859, filed on May 8, 2023.

(51) Int. Cl.
*B60R 9/00* (2006.01)
*B60R 9/06* (2006.01)

(52) U.S. Cl.
CPC ...................................... *B60R 9/06* (2013.01)

(58) Field of Classification Search
CPC ........................................................ B60R 9/06
See application file for complete search history.

(56) References Cited

U.S. PATENT DOCUMENTS 1,500,394 A * 7/1924 Kennedy .................. B60R 9/06 224/524
3,268,132 A * 8/1966 Vogelsang ................ B60R 9/10 224/532
5,664,717 A * 9/1997 Joder ........................ B60R 9/06 224/532
5,690,260 A * 11/1997 Aikins ...................... B60R 9/10 224/532
5,775,560 A * 7/1998 Zahn ......................... B60R 9/06 224/524
5,993,137 A * 11/1999 Harr ........................ B66C 23/44 212/253
6,062,451 A * 5/2000 Lassanske ................. B60R 9/06 224/504
6,139,247 A * 10/2000 Wright ...................... B60R 9/06 414/470
6,443,345 B1 * 9/2002 Bloemer ................... B60R 9/10 224/532
6,460,745 B1 * 10/2002 Weaver ..................... B60R 9/06 224/519
6,478,203 B2 * 11/2002 Burns ..................... B60R 9/065 280/DIG. 6
7,419,076 B1 * 9/2008 Grothues .................. B60R 9/06 224/533
7,819,128 B2 * 10/2010 Clark ..................... A45B 11/00 280/491.1
8,028,874 B2 * 10/2011 Stiles .................... B60P 3/1066 224/519
8,123,190 B2 * 2/2012 Kost ....................... G09F 21/04 248/514

(Continued)

*Primary Examiner* — Jason W San
(74) *Attorney, Agent, or Firm* — Richard Eldredge; Leavitt Eldredge Law Firm

(57) ABSTRACT

An adjustable angle hitch-mounted load carrier for oversized items enables transportation of large or elongated items on a vehicle without a trailer or separate roof rack system. The load carrier features a hitch attachment member, an angular adjustment mechanism, a pivotally connected main support arm, and a cargo rack portion. The adjustable angle hitch-mounted load carrier offers improved flexibility and convenience by allowing users to easily adjust the angle of the main support arm for loading and unloading oversized items.

3 Claims, 5 Drawing Sheets

(56) References Cited

U.S. PATENT DOCUMENTS 8,166,695 B2 * 5/2012 Pippin ..................... F41A 23/06 42/94
8,317,068 B2 * 11/2012 Huang ..................... B60R 9/10 224/532
8,485,207 B1 * 7/2013 Boyington ............. E04H 15/06 280/505
8,505,951 B2 * 8/2013 Bohse ..................... B60D 1/58 280/491.1
8,556,144 B2 * 10/2013 Liu .......................... B60R 9/10 224/532
8,590,758 B2 * 11/2013 Gray ........................ B60R 9/08 224/532
8,720,760 B1 * 5/2014 Simpson ................ B62D 43/02 224/532
8,840,000 B1 * 9/2014 Simpson ................ B62D 43/02 224/532
9,694,759 B1 * 7/2017 VanAmburgh ............ B60R 9/08
D806,625 S * 1/2018 Hoffman ...................... D12/203
11,639,286 B2 * 5/2023 O'Connell ................ B60R 9/06 254/84
11,738,693 B2 * 8/2023 Doherty .................... B60R 9/10 224/324
11,772,569 B2 * 10/2023 Huang ...................... F16B 2/20 224/519
12,479,370 B2 * 11/2025 VanAmburgh ............ B60R 9/06
2002/0050502 A1 * 5/2002 Jeong ........................ B60R 9/06 224/532
2004/0226974 A1 * 11/2004 Anton ....................... B60R 9/06 224/511
2009/0261136 A1 * 10/2009 Skoff ........................ B60R 9/06 224/329
2011/0057008 A1 * 3/2011 Clausen .................... B60R 9/10 224/504
2012/0098235 A1 * 4/2012 DeMers ................... B60D 1/00 280/504
2012/0168480 A1 * 7/2012 Gray ..................... B60P 3/1075 224/400
2012/0305612 A1 * 12/2012 Bell, Jr. .................... B60R 9/06 224/519
2013/0015222 A1 * 1/2013 Horyna, Jr. ................ F41J 9/20 224/519
2013/0264367 A1 * 10/2013 Hill .......................... B60R 9/10 224/505
2014/0246467 A1 * 9/2014 Hein ......................... B60R 9/06 224/400
2014/0263512 A1 * 9/2014 McCoy ..................... B60R 9/06 29/428
2014/0332655 A1 * 11/2014 Colbert ..................... B60R 9/06 224/519
2015/0191129 A1 * 7/2015 Hubacher ................. B60R 9/10 248/649
2015/0217703 A1 * 8/2015 Deming .................... B60R 9/06 224/519
2016/0031377 A1 * 2/2016 Pemberton ................ B60R 9/06 224/519
2016/0185303 A1 * 6/2016 Oxley ....................... B60R 9/06 224/519
2018/0105119 A1 * 4/2018 Spivia ....................... B60R 9/08
2018/0345872 A1 * 12/2018 Kraeuter ................... B60R 9/06
2023/0079766 A1 * 3/2023 Wallace .................... B60R 9/06 224/519
2023/0192005 A1 * 6/2023 Olsen ...................... B60R 9/045 224/519
2023/0211736 A1 * 7/2023 Owen ...................... B62H 3/12 224/519
2023/0234517 A1 * 7/2023 Brown ...................... B60R 9/06 224/519

* cited by examiner

ADJUSTABLE ANGLE HITCH-MOUNTED LOAD CARRIER FOR OVERSIZED ITEMS

BACKGROUND

1. Field of the Invention

The present invention relates generally to cargo carrier systems, and more specifically to a hitch-mounted cargo carrier system for transporting oversized items.

2. Description of Related Art

Hitch-mounted cargo carrier systems are well known in the art and are effective means to transport various items using a vehicle's hitch receiver. For example, FIG. 1 depicts a conventional hitch-mounted cargo carrier 101 having a horizontal platform 103 for supporting items and a hitch attachment member 105 for connecting to the vehicle's hitch receiver.

One of the problems commonly associated with the cargo carrier system 101 is its inability to accommodate oversized items, such as surfboards, paddleboards, lumber, ladders, and other elongated items that cannot fit within the interior of the vehicle or on a standard cargo carrier. For example, cargo carrier 101 does little to address the challenges faced by those needing to transport oversized items without the use of a trailer or a separate roof rack system.

Additionally, conventional systems may not be suitable for vehicles with soft tops, as they cannot support loads on the roof. Furthermore, the fixed horizontal platform 103 design in system 101 offers limited flexibility when it comes to adjusting the angle for loading and unloading oversized items, making it difficult for users to efficiently secure and transport such items.

Accordingly, although great strides have been made in the area of hitch-mounted cargo carrier systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
FIG. 1 is a perspective view of a prior art cargo carrier.
Figure 1:
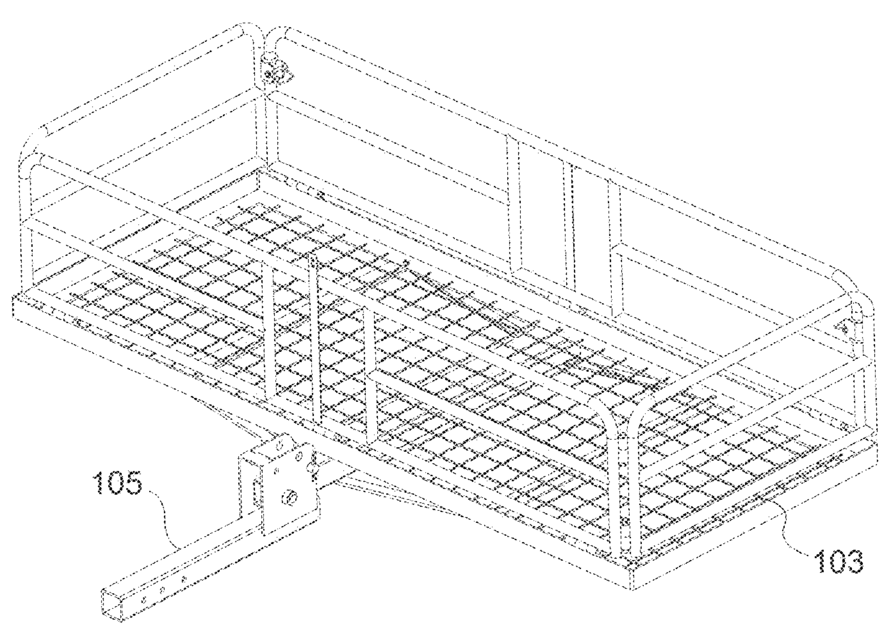

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional hitch-mounted cargo carriers. Specifically, the system of the present invention provides a hitch-mounted load carrier for oversized items that enables easy and secure transportation of elongated or large items above the vehicle without the need for a trailer or separate roof rack system. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
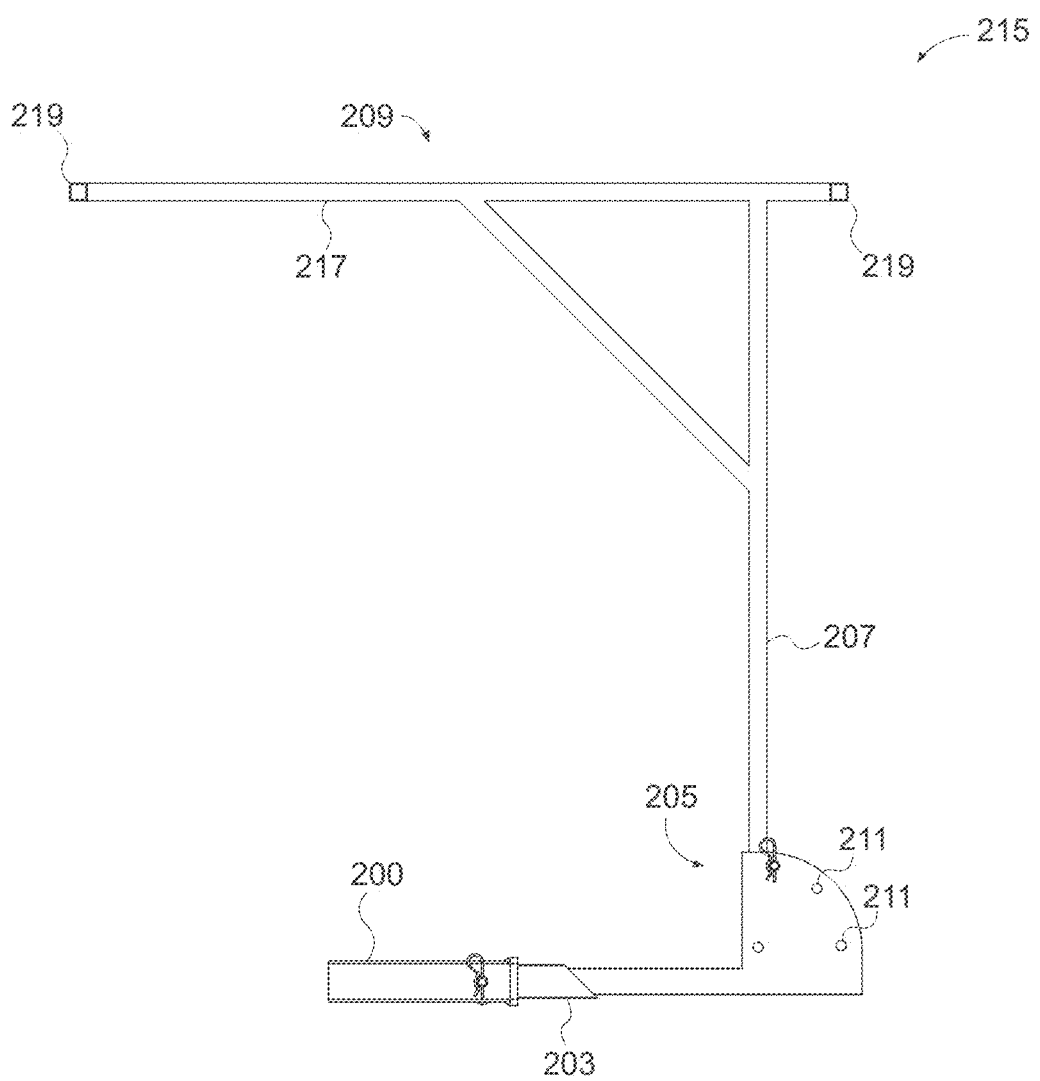
FIG. 2 is a side view of a preferred embodiment of the adjustable angle hitch-mounted cargo carrier system of the present application with the main support arm and cargo rack portion in a stowed (transport) position, shown attached to an exemplary vehicle hitch receiver.
Figure 3:
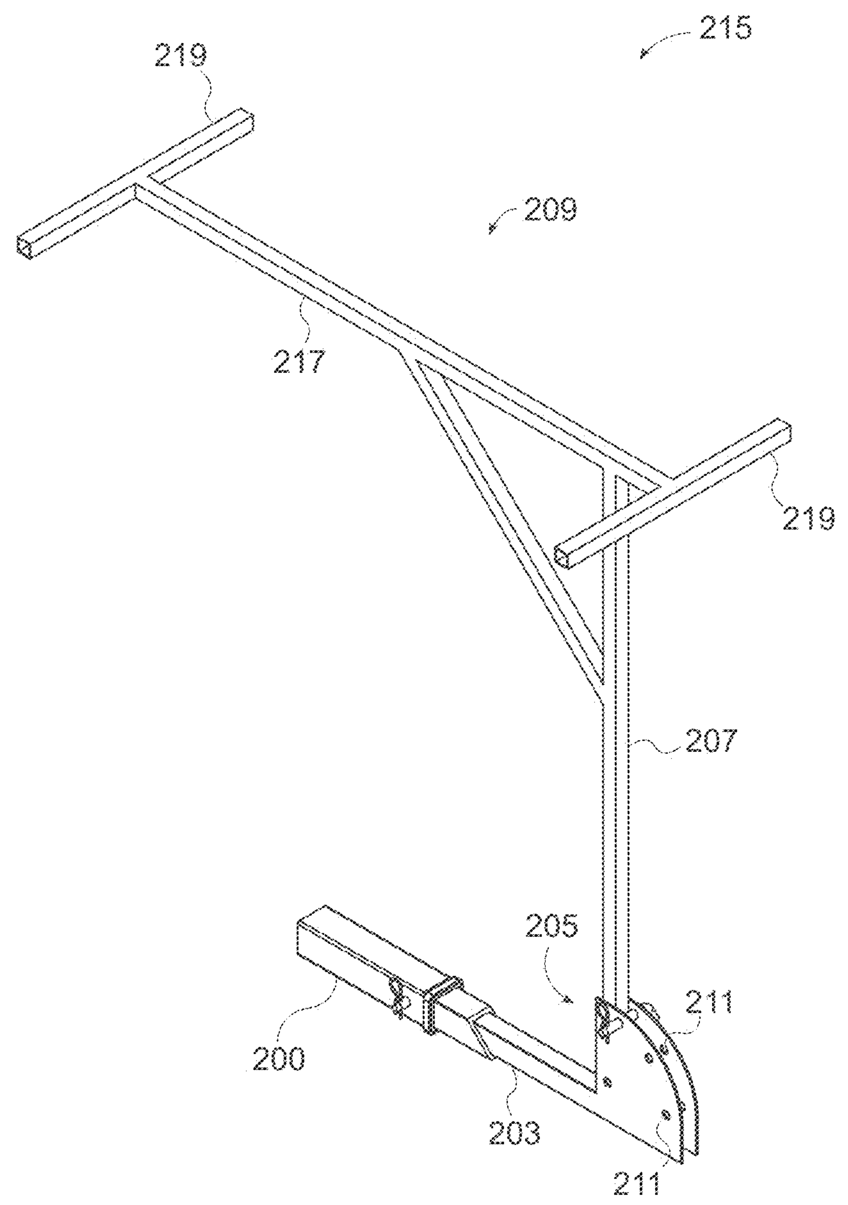
FIG. 3 is a perspective view of FIG. 2.
Figure 4:
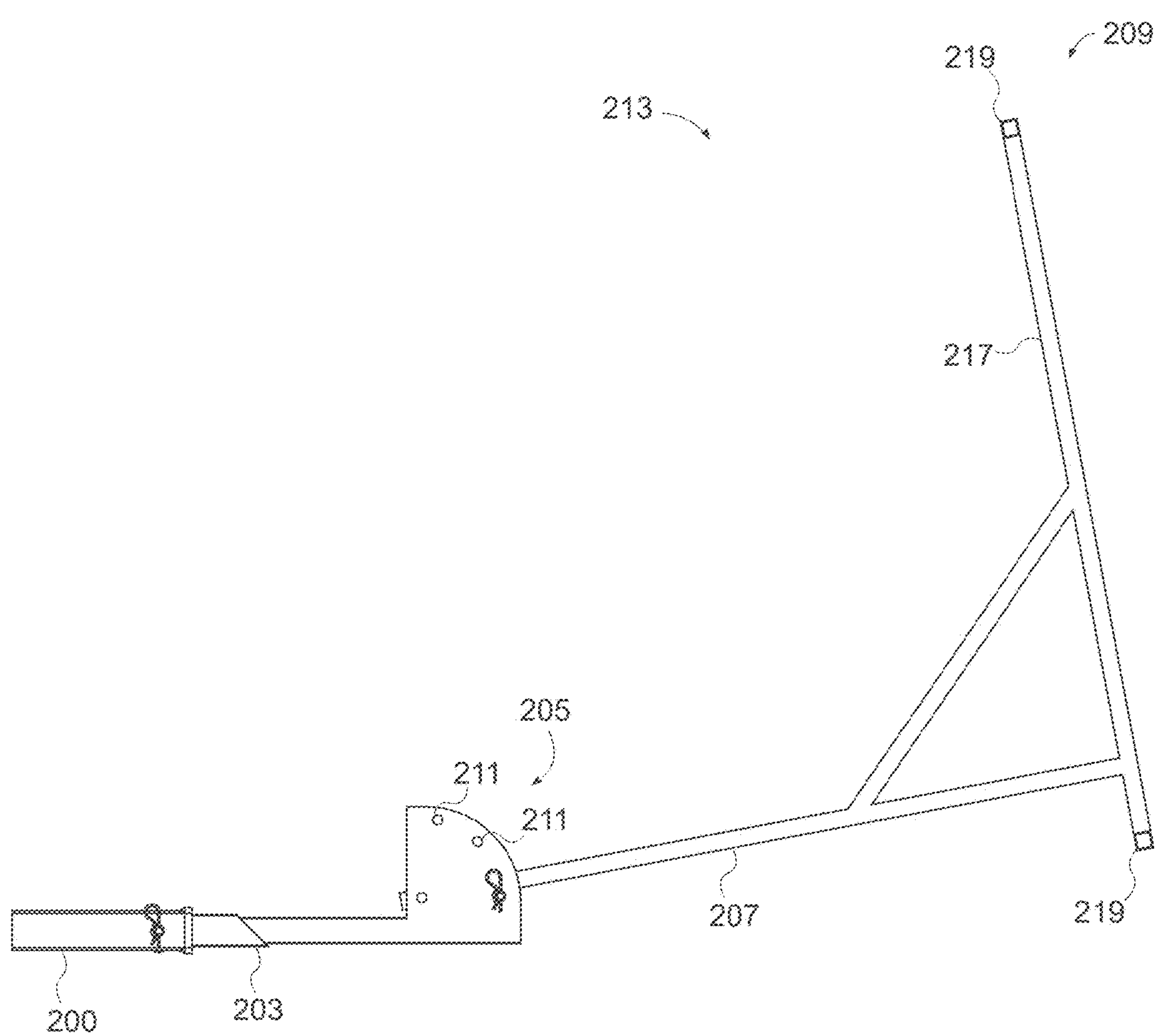
FIG. 4 is a side view of a preferred embodiment of the cargo carrier system of the present application with the main support arm and cargo rack portion in a lowered (loading) position, shown attached to an exemplary vehicle hitch receiver.
Figure 5:
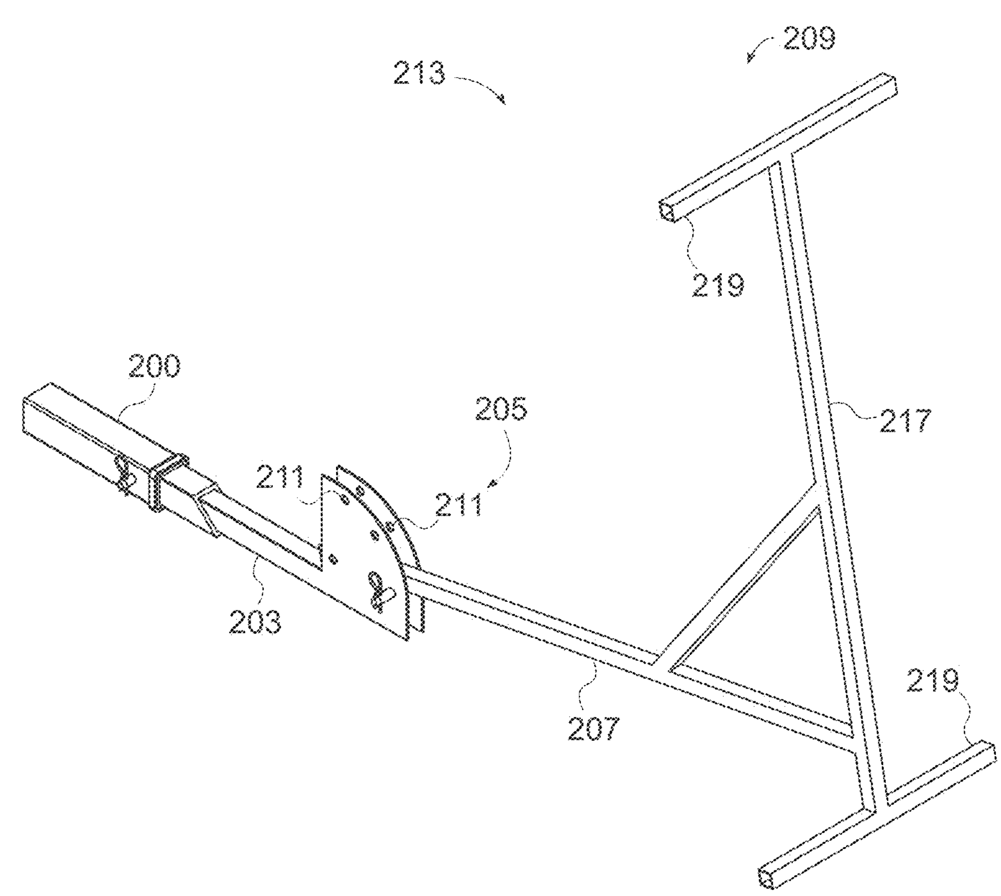
FIG. 5 is a perspective view of FIG. 4.

Referring now to the drawings wherein like reference characters identify corresponding or similar elements throughout the several views, FIGS. 2-5 depict several views of an adjustable angle hitch-mounted load carrier 201 for oversized items in accordance with a preferred embodiment of the present application. It will be appreciated that the adjustable angle hitch-mounted load carrier 201 overcomes one or more of the above-listed problems commonly associated with conventional hitch-mounted cargo carriers. In addition, it should be appreciated that more or fewer of such components may be included in different embodiments of the adjustable angle hitch-mounted load carrier 201.

In the contemplated embodiment, system 201 includes a hitch attachment member 203 configured to attach to a hitch receiver 200 of a vehicle, an angular adjustment mechanism 205 connected to the hitch attachment member 203, a main support arm 207 pivotally connected to the hitch attachment member 203 through the angular adjustment mechanism 205, and a cargo rack portion 209 connected to the main support arm 207 opposite the angular adjustment mechanism 205.

In the preferred embodiment, the angular adjustment mechanism 205 is a pin-and-hole adjustment mechanism 205 with a plurality of adjustment holes 211 distributed across approximately a 90-degree arc from an approximately horizontal orientation of 0 degrees parallel to the hitch attachment portion to a substantially vertical orientation of 90 degrees perpendicular to the hitch attachment portion. The main support arm 207 is selectively adjustable between a lowered position 213 in the horizontal orientation and a stowed position 215 in the vertical orientation through the angular adjustment mechanism 205. Thus, the cargo rack portion 209 is configured to support and secure an oversized load suspended above the vehicle in the stowed position 215.

Further, in the preferred embodiment, the cargo rack portion 209 comprises a central support member 217 and a plurality of lateral support members 219. The lateral support members 219 are perpendicularly connected to the central support member 217 opposite each other along the central support member 217, forming approximately a capital I shape, though different configurations for the lateral support members 219 and any other additional support members may be comprised in different embodiments as desired.

It is also contemplated and will be appreciated that the adjustable angle hitch-mounted load carrier 201 can incorporate padding or cushioning material on the cargo rack portion 209 to protect loads during transport, adjustable lateral support members 219 to accommodate different sizes and shapes of oversized items, and locking mechanisms or straps to secure the oversized loads to the cargo rack portion 209 during transport.

It should also be appreciated that one of the unique features believed characteristic of the present application is that it provides an efficient and convenient way to transport oversized items on a vehicle without the need for a trailer or a separate roof rack system. The adjustable angle hitch-mounted load carrier 201 allows users to easily load and unload oversized items by adjusting the main support arm 207's angle, offering improved flexibility and ease of use compared to conventional hitch-mounted cargo carriers.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A load carrier system for a hitch receiver of a vehicle, comprising:

- a hitch attachment member that attaches to the hitch receiver;
- an adjustment mechanism connected to the hitch attachment member, the adjustment mechanism having a lower locking position and a stowed locking position;
- a main support arm pivotally connected to the hitch attachment member through the adjustment mechanism, wherein the main support arm is selectively adjustable between the lowered position and the stowed position through the adjustment mechanism; and
- a cargo rack portion connected to the main support arm opposite the adjustment mechanism, wherein the cargo rack portion is configured to support and secure an oversized load above the vehicle in the stowed position, the cargo rack portion having:
  - a elongated center support member extending from a first end to a second end;
  - a first lateral support member secured to the first end and extending perpendicular to a length of the elongated center support member; and
  - a second lateral support member secured to the second end and extending perpendicular to the length of the elongated center support member.

2. The system of claim 1, wherein the adjustment mechanism can be selectively fastened in a range of angular positions between 0 degrees and 90 degrees relative to the hitch attachment portion.

3. The system of claim 1, further comprising padding or cushioning material affixed to the cargo rack portion to protect loads during transport.

* * * * *